Sept. 26, 1939.                F. W. SULLINGER ET AL                2,174,017
                                    GONIOMETER
                        Filed July 2, 1937        2 Sheets-Sheet 1
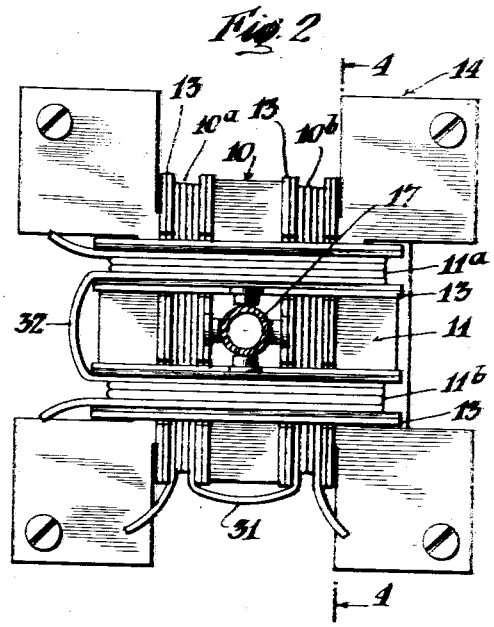
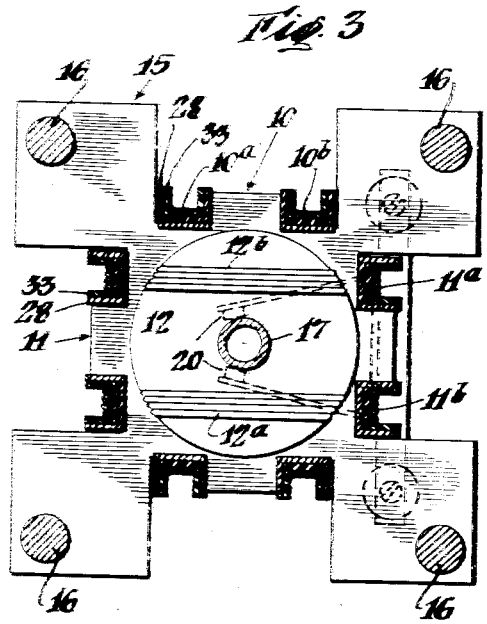
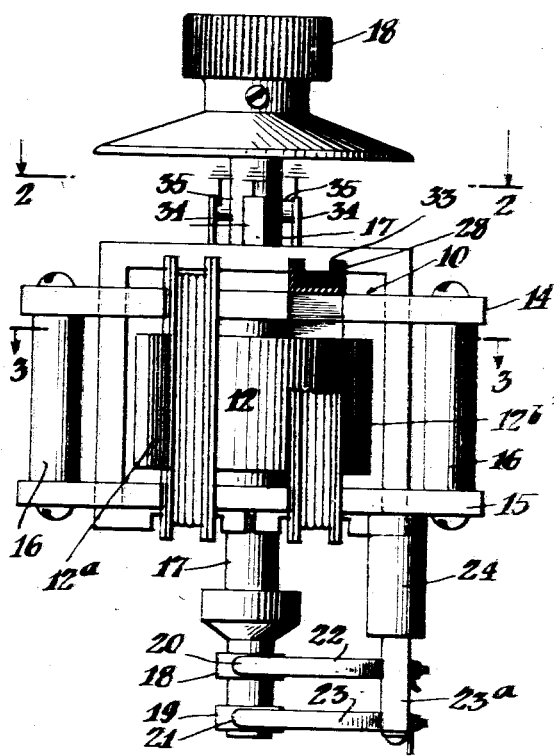
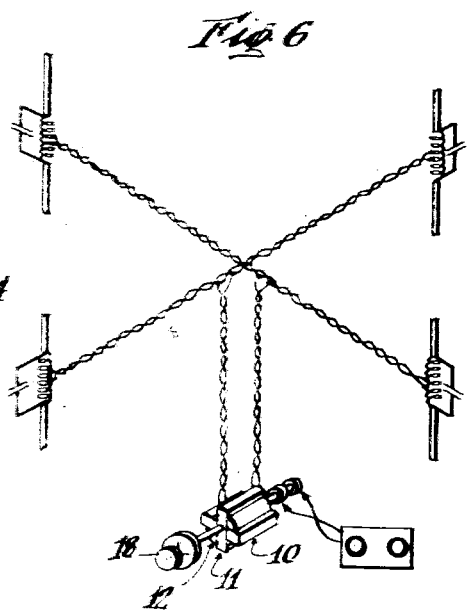
INVENTORS
Ferris W. Sullinger
BY Charles W. Winter, Jr.
their ATTORNEYS

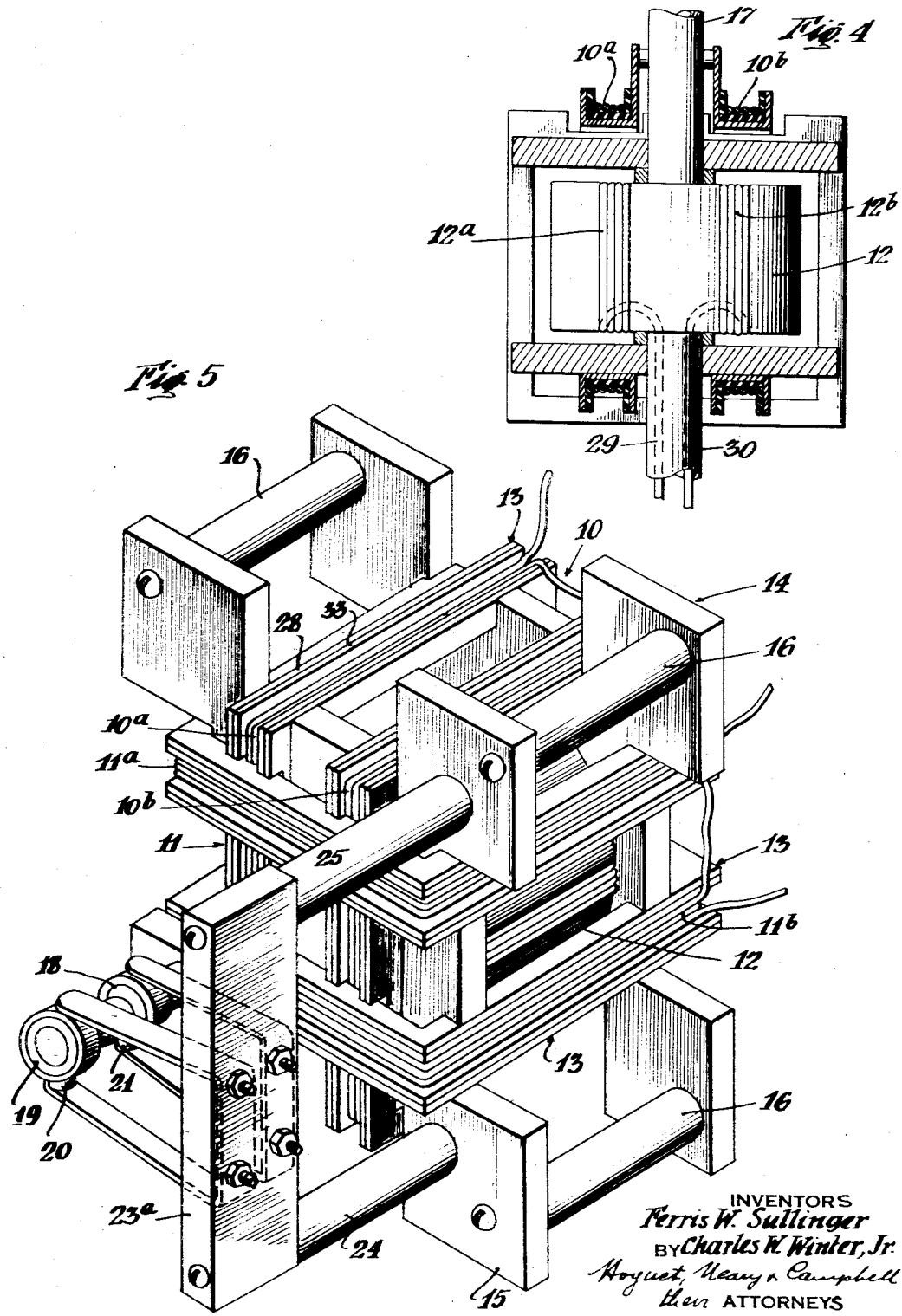

Patented Sept. 26, 1939

2,174,017

UNITED STATES PATENT OFFICE 2,174,017

GONIOMETER

Ferris W. Sullinger, Coral Gables, and Charles W. Winter, Jr., Coconut Grove, Fla., assignors to Pan American Airways Corporation, Jersey City, N. J., a corporation of Delaware Application July 2, 1937, Serial No. 151,620

6 Claims. (Cl. 250—11)

Our invention relates to goniometers and more particularly to radio goniometers having mechanical and electrical symmetry whereby sharp minima of high frequency signals, received by the antennae to which the goniometer is connected, are obtained.

One of the important features of our goniometer is the provision of metal channels for effective electrostatic shielding between the two stator windings and between each stator winding and the rotor winding. The construction and arrangement of these metal channels provides electrostatic symmetry of the stator windings to ground and electro-magnetic symmetry to the rotor winding.

Another important feature is the accurate mechanical construction of the winding forms and other mechanical parts of the goniometer that makes it possible to produce a quantity of these instruments which will be practically identical electrically and mechanically.

We have found in connection with radio direction finders that the electrostatic and electro-magnetic symmetry characteristic of our goniometer is necessary for obtaining accurate indications of the direction of arrival of waves received by the antennae of the direction finders. If the goniometer does not possess electrical symmetery, which is in turn dependent upon accurate construction and effective shielding, it will not effect the sharp cut-off or minimum of the received signals that is essential to determining the direction of arrival of these signals and accordingly the direction of the transmitting station, which may be a stationary or a moving station.

In addition to the goniometer requirements, it should be remembered that electrical symmetry of the radio direction finders is also important for obtaining sharp minima of the received signals. Various means and methods for obtaining these desired electrical characteristics in the radio direction finder are disclosed in a copending application Serial Number 124,108, filed jointly by Hugo C. Lenteritz and Ferris W. Sullinger on February 4, 1937. When the radio direction finder has been electrically balanced as explained in the above application and the goniometer connected to this direction finder has the above described mechanical and electrical features characteristic of our present invention, sharp minima will be obtained and likewise accurate and reliable indications of the direction of arrival of the received waves.

This desired result has great practical importance in aerial navigation since the safety of air travel is oftentimes dependent upon the pilot obtaining accurate information as to his direction of flight. The ground station cannot give the pilot reliable information as to his bearings unless the direction finder system including the goniometer and all other parts provides accurate indications of the direction of arrival of signals transmitted by the pilot. The goniometer is a vital part of the direction finder system and if it is out of electrical balance sharp minima will not be obtained, although all other parts of the system may be functioning properly.

The novel features of our present invention are set forth with particularity in the appended claims. The invention itself, however, both as to its organization and method of operation, will be easily understood from the following description taken in conjunction with the drawings, in which:

Figure 1 is a top view of one embodiment of the goniometer of our invention;

Figure 2 is a front view taken along lines 2—2 of Figure 1;

Figure 3 is a cross-sectional view taken along lines 3—3 of Figure 1;

Figure 4 is a section view taken along lines 4—4 of Figure 2;

Figure 5 is a perspective view of the goniometer; and

Figure 6 is a diagrammatic view of an elevated, spaced-fixed type of direction finder system showing electrical connections with the goniometer.

Referring now more specifically to the drawings, the goniometer comprises two stator windings shown generally at 10 and 11, and a rotor winding 12, the windings being supported by four rectangular frames 13. These frames are notched to fit together and are held in place by two rectangular frames 14 and 15, which are in turn supported by four insulator posts 16. The stator winding 10 is divided into two halves 10a and 10b, and the stator winding 11 is divided into two halves 11a and 11b. Likewise, the rotor winding 12 is divided into two halves 12a and 12b.

The rotor winding 12 is mounted upon a hollow shaft or tube 17, which has attached to one end a knob 18 for effecting rotation of the shaft and accordingly rotation of the rotor winding 12. On the opposite end of the shaft 17 are mounted two slip rings 18 and 19, which are electrically connected to the rotor windings 12a and 12b by means of lead wires 29 and 30, extending through the hollow shaft 17. The slip rings 18 and 19 provide electrical contact with the brushes 20 and 21. Brush arms 22 and 23 connect the brushes 20 and 21 to an insulating member 23a, which is supported by insulator posts 24 and 25.

The stator windings 10 and 11 have their midpoints 31 and 32 located conveniently for center taps which may be connected to ground. The windings 10a, 10b, 11a and 11b are each located in a metal channel 28, which has an insulator lining 33. Each of the four channels 28 has a metal strip extension 34 which supports a brush 35. The four brushes 35 provide sliding electrical contact with the shaft 17. This arrangement establishes a common point for electrically connecting together all metallic members that serve as electrostatic shields. This minimizes the possibility of circulating RF current in any of these members and the resultant electromagnetic field therefrom which would, in effect, interfere with and distort the electromagnetic fields set up by the stator windings. The metal tube shaft 17, housing the rotor lead wires 29 and 30, effectively shields these leads electrostatically from the stator windings 10 and 11.

The insulating end plates 14 and 15, which support the rectangular stator winding channels 13, are designed so that they may be machined on a milling machine. This insures that the two stator windings will always have an exact 90° relation with each other; further, that the two halves of each winding will always be the same distance apart and that the four halves of the windings will always have a symmetrical relationship to each other and to the rotor winding. The rotor also is designed so that the winding slots in it may be cut on a milling machine; this makes possible extreme accuracy in locating these slots and extreme accuracy in the dimensions of the slots.

The use of two narrow metal channels to enclose the two halves of each stator winding was found to be of considerable importance. In the original model developed and constructed, a single wide metal channel was employed to enclose both halves of one stator winding; with this arrangement we found that the frequency of the oscillating detector in the receiver, connected to the rotor winding, varied a bothersome amount as the rotor was turned. It was believed that the major portion of this frequency change was caused by "shorted turn" effect in the bottom surface of the channel which had a relatively large area; that is, the inductance and resistance of the rotor winding would change with rotation as its position varied in relation to the bottom surface of each wide channel. This was substantiated by the fact that when the single wide metal channel was replaced with the two narrow metal channels the frequency change dropped to such a low value that it was no longer bothersome.

It is to be understood that various modifications may be made in the illustrative embodiments of our device as described and illustrated herein without departing from the scope of our invention. The appended claims are addressed to some of the novel features of our invention.

We claim:

1. In a radio goniometer, the combination of spaced insulating frame members, a search coil rotatably mounted between said frame members, angularly related fixed coils supported on said frame and means for electrostatically shielding said fixed coils and maintaining them in electrostatic and electromagnetic symmetry comprising at least two channeled metallic frames supported on said frame members in right angular relationship, and each having a separate fixed coil wound in and supported thereby.

2. In a radio goniometer, the combination of an insulating framework, a search coil rotatably mounted within said framework, at least two angularly related fixed coils and means for electrostatically shielding said fixed coils and maintaining them in electrostatic and electromagnetic symmetry comprising channeled metallic frames supported on said framework, at least one of said frames being disposed at right angles to at least one other frame, each of said fixed coils having a portion thereof wound in and supported by one of said frames, and means for electrically connecting the metallic frames.

3. In a radio goniometer, the combination of a pair of spaced insulating end frame members, a search coil rotatably mounted between said members, at least two right angularly related fixed coils and means for electrostatically shielding said fixed coils and maintaining them electrostatically and electromagnetically symmetrical comprising a first pair of spaced parallel metallic channeled frames supported on said members, another pair of parallel channeled metallic frames supported on said frame members at right angles to said first pair of channeled frames, each of said fixed coils being wound in and having sections thereof supported by one pair of channeled frames.

4. In a radio goniometer, the combination of a pair of spaced insulating frame members, a search coil rotatably mounted between said frame members, a pair of right angularly related fixed coils and means for electrostatically shielding said fixed coils and maintaining them in electrostatic and electromagnetic symmetry comprising a first pair of substantially rectangular metallic frames of channel-shaped cross-section supported in spaced relationship on said frame members, another pair of similar frames supported in spaced relationship on said frame members and at right angles to said first pair of frames, and each of said fixed coils being wound in and having sections thereof supported by one pair of frames.

5. In a radio goniometer, the combination of a pair of end frame members each having two pairs of parallel edges at right angles to each other, pairs of spaced notches in each lateral edge, means for maintaining said frame members in spaced relation, a hollow metallic shaft journalled in said frame members, a search coil mounted on said shaft, a pair of angularly related fixed coils and means for electrostatically shielding the fixed coils and maintaining them in electrostatic and electromagnetic symmetry comprising pairs of substantially rectangular channeled metal frames mounted in said notches, one pair being at right angles to the other pair, and each fixed coil having sections thereof supported in one parallel pair of frames, and means for electrically connecting each frame to said shaft.

6. The device set forth in claim 5 in which the frames of each pair have spaced notches therein for receiving a portion of the frames of the right angularly related pair of frames.

FERRIS W. SULLINGER.
CHARLES W. WINTER, Jr.